US007127085B2

(12) United States Patent
Kim et al.

(10) Patent No.: US 7,127,085 B2
(45) Date of Patent: Oct. 24, 2006

(54) IMAGE PROCESSING METHOD FOR AUTOMATIC IMAGE REGISTRATION AND CORRECTION

(75) Inventors: Tae Jung Kim, Daejeon (KR); Yong Jo Im, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 560 days.

(21) Appl. No.: 10/264,071

(22) Filed: Oct. 2, 2002

(65) Prior Publication Data
US 2004/0037451 A1 Feb. 26, 2004

(30) Foreign Application Priority Data
Aug. 22, 2002 (KR) ................. 2002-49753

(51) Int. Cl.
*G06K 9/00* (2006.01)
(52) U.S. Cl. ............................................. 382/113
(58) Field of Classification Search ................... None
See application file for complete search history.

(56) References Cited

U.S. PATENT DOCUMENTS

| 4,644,582 | A | * | 2/1987 | Morishita et al. | 382/130 |
| 4,802,757 | A | * | 2/1989 | Pleitner et al. | 356/2 |
| 5,187,754 | A | * | 2/1993 | Currin et al. | 382/284 |
| 5,949,914 | A | * | 9/1999 | Yuen | 382/254 |
| 6,640,000 | B1 | * | 10/2003 | Fey et al. | 382/128 |
| 6,668,082 | B1 | * | 12/2003 | Davison et al. | 382/190 |
| 2003/0179950 | A1 | * | 9/2003 | Komura et al | 382/275 |

OTHER PUBLICATIONS

Taejung Kim, et al., "Automatic Satellite Image Registration by GCP Chips and RANSAC", The 6th World Multiconference on Systemics, Cybermetics and Informatics, Proceedings vol. IX. pp. 134-139 (Jul. 14, 2002).

* cited by examiner

*Primary Examiner*—Samir A. Ahmed
*Assistant Examiner*—ONeal R. Mistry
(74) *Attorney, Agent, or Firm*—Graybeal Jackson Haley LLP (57) ABSTRACT

There is provided an image processing method for use in a computer system having a database for storing a reference image, control point chips (CP chips) of the reference image, and auxiliary data including geographic coordinates, incidence angles and orientation angles of the reference image and the CP chips, comprising the steps of (a) a CP chip extraction step of, when a target image and auxiliary data including location information and incidence and orientation angle information of the target image are inputted, finding out a region of the reference image corresponding to a region including the target image, selecting the found region as a control region, and extracting the CP chips included in the control region of the reference image, (b) an image matching step of searching matching points of the target image for the control points within the CP chips extracted from the CP chip extraction step, (c) a mismatching point removing step of finding out and removing mismatching points among matching results obtained from step (b), and (d) a precise image correction step of arranging the target image into a geographic coordinate system using the matching results obtained after performing step (c).

9 Claims, 6 Drawing Sheets

IMAGE PROCESSING METHOD FOR AUTOMATIC IMAGE REGISTRATION AND CORRECTION

CROSS-REFERENCE TO RELATED APPLICATION

The present application claims priority from Korean patent application no. 2002-49753, filed Aug. 22, 2002, presently pending.

BACKGROUND OF THE INVENTION

1. Description

The present invention relates to a method for processing a satellite image or general image, and more particularly, to a method for automatically performing an image matching process, an image registration and a precise correction process.

2. Background of the Invention

In general, remote sensing data measured from a satellite or aircraft include a great deal of errors and distortions due to an instrument state upon measurement, an atmospheric condition, a moving direction and posture of a platform, a map projection method, and the like. Thus, these errors or distortions should be eliminated or corrected for image restoration. To this end, geometric correction for correcting a difference between a geometric pattern of a collected image and a reference map is generally performed.

This geometric correction is a process of correcting an inherent geometric distortion of the image. The geometric correction is mainly divided into system correction using a result of systematically analyzing causes of the errors and distortions and precision correction using ground control points.

The system correction is a process of analyzing all the causes of the distortions such as an altitude change and shaking of the platform occurring when collecting the image, optical characteristics of a measuring instrument, topographic undulation, earth's rotation, and a map projection method, calculating an inverse transformation algorithm for correcting the distortion of the collected image using the analysis result, and restoring the collected image to its original state using the inverse transformation algorithm. The system correction has an advantage in that all the distortions included in the same transformation algorithm can be easily corrected if all the causes of the distortions of the collected image can be accurately analyzed so that the inverse transformation algorithm can also be accurately calculated. However, there are still disadvantages in that it is not easy to analyze all the causes of the distortions of the collected image and it is also difficult to precisely correct the distortions of the image in case of severe topographic undulation and high image resolution.

The precision correction is a process of analyzing only a distortion degree of the collected image without considering the distortion causes thereof, finding a correction formula which can be used to correlate the collected image with a reference map using the analysis result, and correcting the image distortion using the correction formula. Here, the control point is a coordinate of a specific position with the same shape which has been extracted from the collected image and the reference map so as to match the image with the reference map.

The distortion correction using the control point has advantages in that it can be used even when it is difficult to know or analyze the distortion cause, and the image distortion can be corrected more accurately than the system correction if the control point may be accurately extracted. However, there is a disadvantage in that if the control point is incorrectly extracted, the accurate correction result cannot be obtained. In the past, an operator has manually extracted the control point while viewing the collected image and the reference map with his/her naked eyes. Thus, a correction result may vary greatly according to a degree of skill of the operator who has extracted the control point. Further, there is inconvenience in that the control point should be obtained again every measuring day even though the same area would be measured. Therefore, many researches on methods for automatically extracting the control point have been recently conducted.

The methods for automatically extracting the control point developed heretofore are largely divided into semi-automatic extraction methods and fully automatic extraction methods.

One of the methods for semi-automatically extracting the control point is disclosed in Korean Patent Laid-Open Publication No. 1999-47500 (published on Jul. 5, 1999). According to the method disclosed in the publication, if the operator selects four control points, a system calculates a transformation formula and an inverse transformation formula used for correcting the image using the selected four control points, selects new additional control points, and finally corrects the image. However, since the operator should initially select and input four or more control points, there still remains a problem of the prior art in that the correction result varies according to the degree of skill of the operator, and much time and higher costs are needed for correcting the image.

On the other hand, as the methods of automatically extracting the control points, there are a method of extracting image characteristics and control points using a wavelet scheme, a method of automatically extracting the control points from Landsat satellite images, a method of automatically extracting the control points using a multispectral band, a method of automatically extracting the control points using a generic algorithm, and an automatic geometric correction technique using a DTM (digital terrain model). These various methods of automatically extracting the control points describes only a process of automatically extracting the control point from the image, but they never suggest or teach a process of finding out and overcoming the errors included in the extracted control points. According to the aforementioned methods, therefore, the control point can be automatically extracted, but there is also a problem in that it is difficult to perform the accurate image registration and the precise image correction due to the errors included in the extracted control points.

SUMMARY OF THE INVENTION

An object of the present invention for solving the problems in the prior art is to provide an image processing method by which control points are automatically extracted and mismatched control points are then removed from the extracted control points so that image registration and precise image correction can be accurately and accurately performed.

According to an aspect of the present invention for achieving the object, there is provided an image processing method for use in a computer system having a database for storing a reference image, control point chips (CP chips) of the reference image, and auxiliary data including geographic coordinates, incidence angles and orientation angles of the reference image and the CP chips, comprising the steps of (a) a CP chip extraction step of, when a target image and auxiliary data including location information and incidence and orientation angle information of the target image are inputted, finding out a region of the reference image corresponding to a region including the target image, selecting the found region as a control region, and extracting the CP chips included in the control region of the reference image, (b) an image matching step of searching matching points of the target image for the control points within the CP chips extracted from the CP chip extraction step, (c) a mismatching point removing step of finding out and removing mismatching points among matching results obtained from step (b), and (d) a precise image correction step of arranging the target image into a geographic coordinate system using the matching results obtained after performing step (c).

Further, there is also provided a computer-readable recording medium in which a program for performing an image processing method of the present invention is recorded.

BRIEF DESCRIPTION OF THE DRAWINGS

The above and other objects, advantages and features of the present invention will become apparent from the following description of a preferred embodiment given in conjunction with the accompanying drawings, in which.

DETAILED DESCRIPTION OF THE INVENTION

Hereinafter, a preferred embodiment of an image processing method according the present invention will be explained in detail with reference to the accompanying drawings.

The present invention is an algorithm running in a general computer system. The general computer system comprises a conventional input/output device, a microprocessor for controlling the system as a whole, a ROM for storing the image processing algorithm of the present invention and providing the microprocessor with the algorithm, a RAM for storing temporary data produced while the microprocessor executes the image processing algorithm of the present invention, and a database for storing data needed for performing the image processing algorithm of the present invention.

The database includes a reference image, control point chips (CP chips) of the reference image, and auxiliary data. Here, the CP chips mean images which are cut from the reference image in a predetermined size around control points. The auxiliary data mean records of a satellite state and an image state at the time of photographing a satellite image. The information included in the auxiliary data may be slightly different from one another depending on the kinds of satellites. However, the auxiliary data generally include information on when the satellite image has been photographed, information on the satellite, and information on a tilt angle, incidence angle and orientation angle of the satellite image. The information on when the satellite image has been photographed includes date and time when photographed. The information on the satellite includes orbit information such as a location and velocity of the satellite and brief coordinate information (including an error range). The tilt angle of the satellite image is a photographing angle when the satellite image is photographed, the incidence angle is an angle between a camera and a surface of the earth, and the orientation angle is an angle between a true north direction and a photographing direction. Besides, the auxiliary data may include other information such as a processing level, a calibration parameter, gain/offset values, and an image size.

Figure 1:
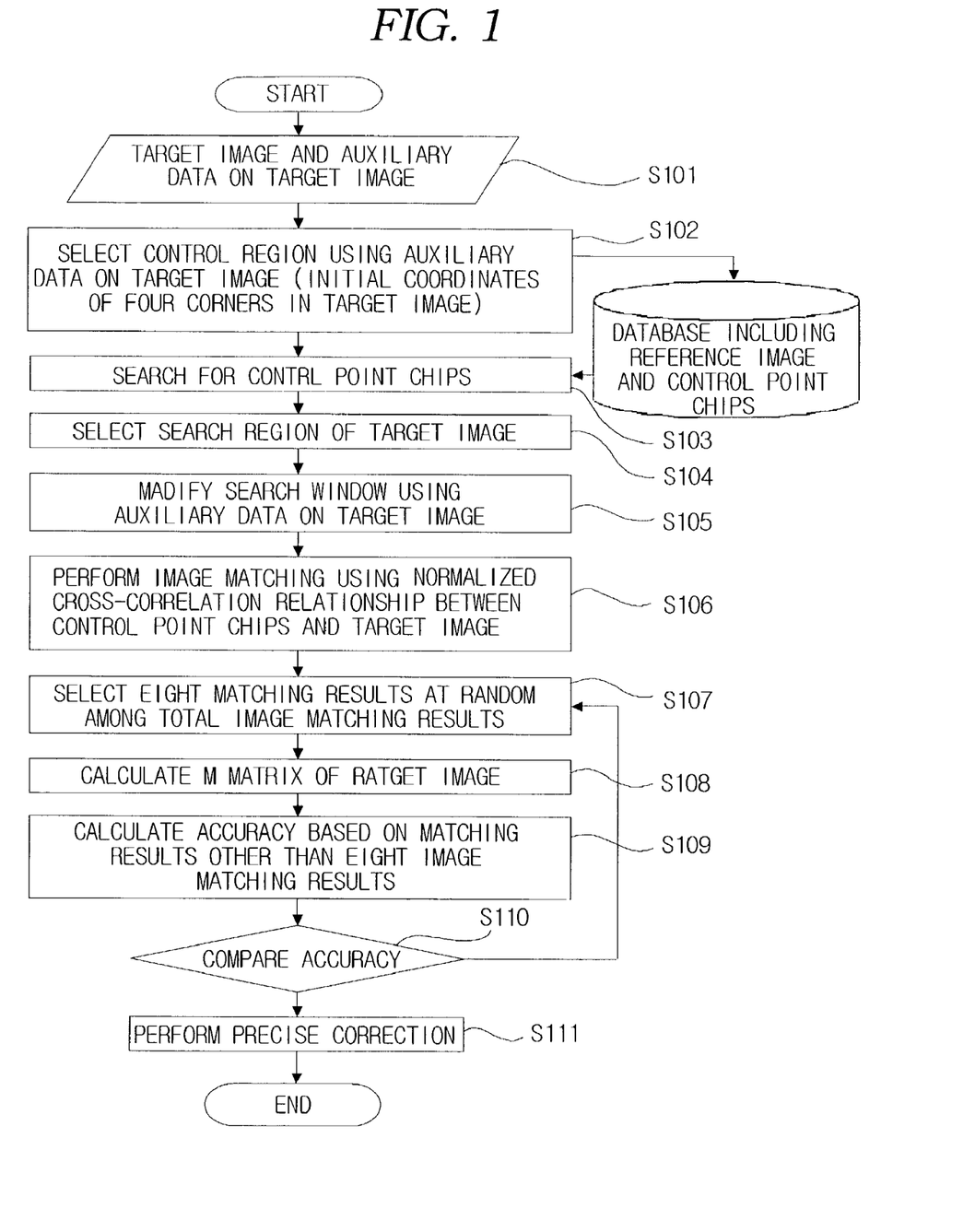
FIG. 1 is a flowchart illustrating operating procedures of an image processing method according to the present invention.

FIG. 1 is a flowchart illustrating operating procedures of the image processing method according to the present invention.

The image processing method of the present invention comprises an image matching step of finding out the matching points between a target image and the reference image, a mismatching point removing step of removing mismatching points from matching results of the two images, and a precise image correcting step of rearranging the target image in a geographic coordinate system.

In a technical field of image processing, image matching means a process of finding out points to be matched with one another from two or more stereographic images on which an identical object is photographed. That is, the image matching process is a step of searching the database if the target image and its auxiliary data are inputted, and finding out the reference image corresponding to an area including the relevant target image, thereby finding out the matching points between the target image and the reference image.

Figure 2:
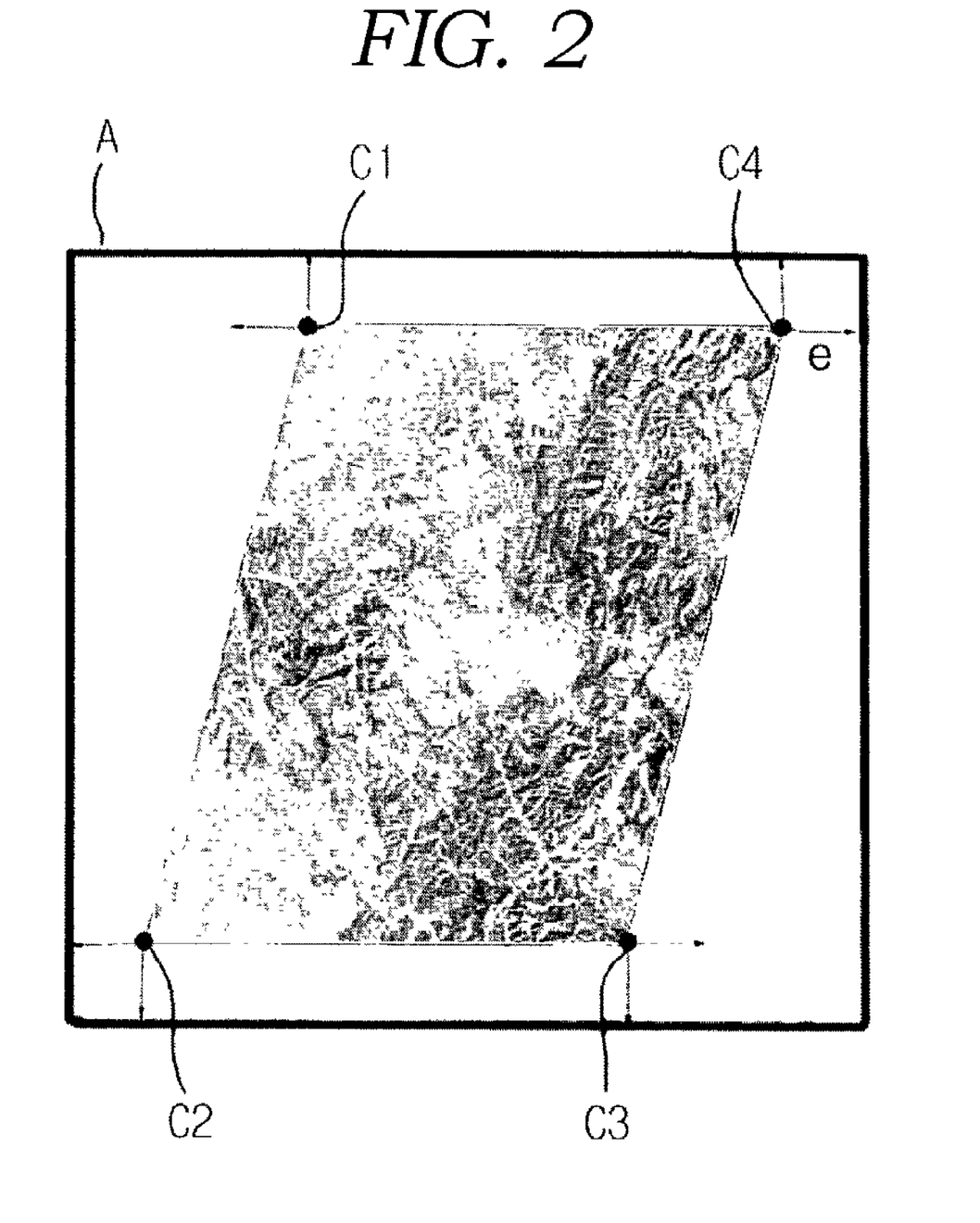
FIG. 2 is a view showing a state where a control region of a reference image is selected using auxiliary data on a target image.

Now, the image matching step will be explained in detail. If the target image and the auxiliary data thereof are inputted through the conventional input/output device of the computer system (step S101), the microprocessor selects a control region on the reference image using the auxiliary data of the target image (step S102). At this time, the auxiliary data of the target image is used as coordinate information on four boundary corners of the target image. In a case where the target image is the satellite image, the satellite provides the coordinate information on the four boundary corners of the target image and the information on the error range as the auxiliary data, and then, the microprocessor selects a region slightly exceeding the error range from the four boundary corners of the target image for the control region. For example, assuming that as shown in FIG. 2, the coordinates of the four boundary corners of the target image are C1 to C4, respectively, and the error range is e, the control region A of the reference image is finally selected as a region covering the error range from the four boundary corners of the target image.

Next, the CP chips included in the control region of the reference image are searched (step S103). Then, in order to find out positions corresponding to the CP chips from the target image, a search region of the target image is selected (step S104). To this end, a difference between brief position information and actual position information of the target image is used in the present invention. For example, if a position error of the SPOT image is approximately ±2 km and its resolution is 10 m, the search region of the target image is selected as a region of about 400-by-400 pixels corresponding to a length of 4 km in longitudinal and transverse directions from the control point.

The microprocessor selects the search region of the target image and then searches the positions corresponding to the CP chips of the reference image from the search region of the target image. At this time, the reference image and the target image have been heretofore searched using a rectangular search window having a fixed size. However, according to the present invention, size and shape of the search window can be modified depending on the photographed state of the reference and target images (step S105).

To this end, there can be provided a method of changing the size of the search window using the incidence angle, a method of changing the size of the search window using the tilt angle, and a method of rotating the search window using the orientation angle.

According to the method of changing the size of the search window using the incidence angle, the size of the search window of the target image can be changed based on a scale factor s which is obtained by dividing a cosine value of the incidence angle of the target image by a cosine value of the incidence angle of the reference image, as expressed in the following formula (1).

$$s = \cos(\text{incidence angle of target image})/\cos(\text{incidence angle of reference image}) \quad (1)$$

The method of changing the size of the search window using the tilt angle is similar to the method of changing the size of the search window using the incidence angle.

According to the method of rotating the search window using the orientation angle, a coordinate $(X_0, Y_0)$ of a central point of the target image, a distance (dx, dy) of an arbitrary lattice point from the central point in x- and y-directions, and the orientation angle ($\Theta$) of the target image are first substituted into the following formula (2), and a moved point $(X_{new}, Y_{new})$ of the lattice point is then calculated. Then, the lattice point in the target image is shifted by the coordinate of the central point and rotated about the central point with respect to the reference image.

$$X_{new} = \cos\Theta \times dx - \sin\Theta \times dy + X_0$$

$$Y_{new} = \sin\Theta \times dx + \cos\Theta \times dy + Y_0 \quad (2)$$

Figure 3A:
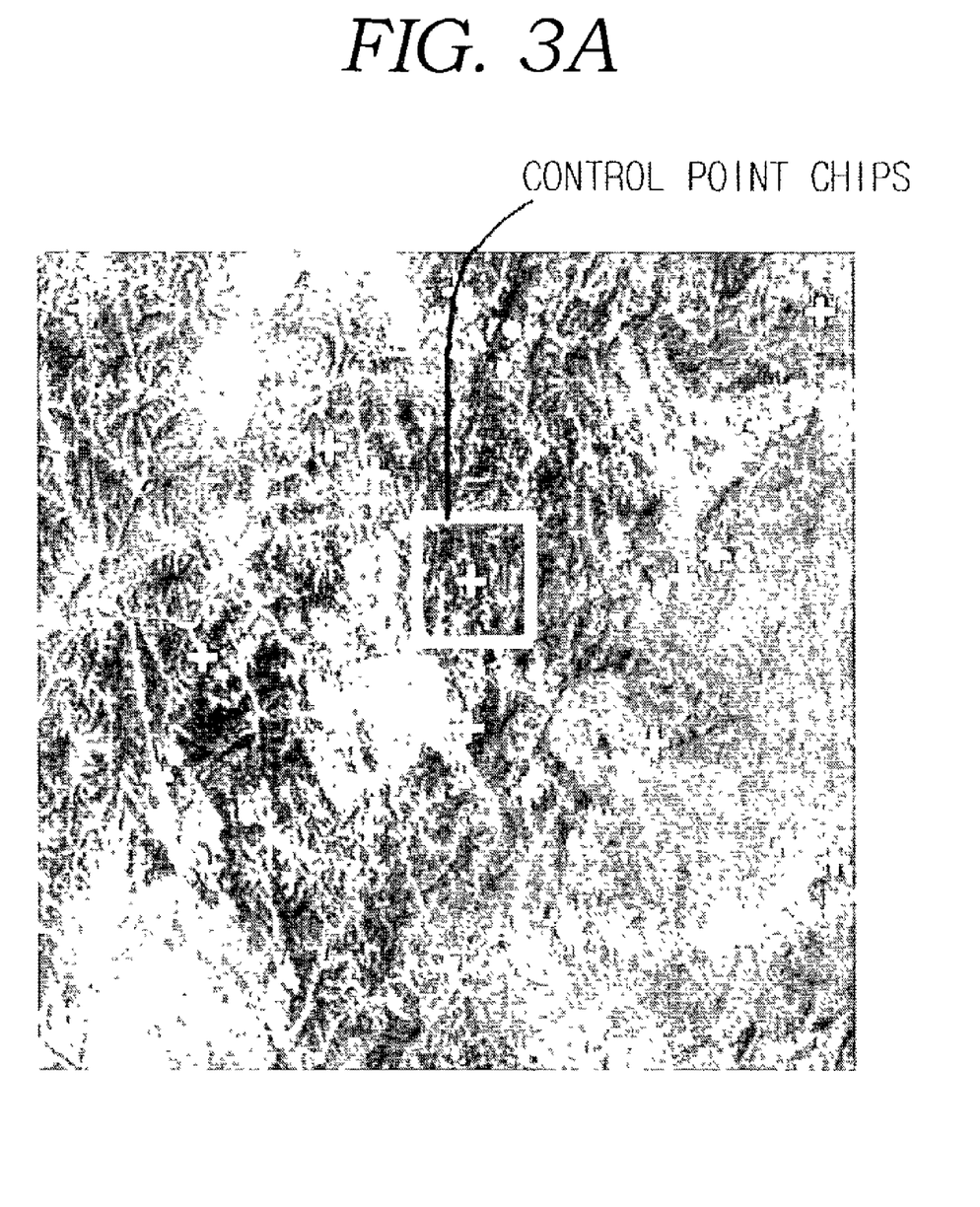
FIG. 3 is a view showing a state where a search window is rotated according to orientation angles of the reference image and the target image.
Figure 3B:
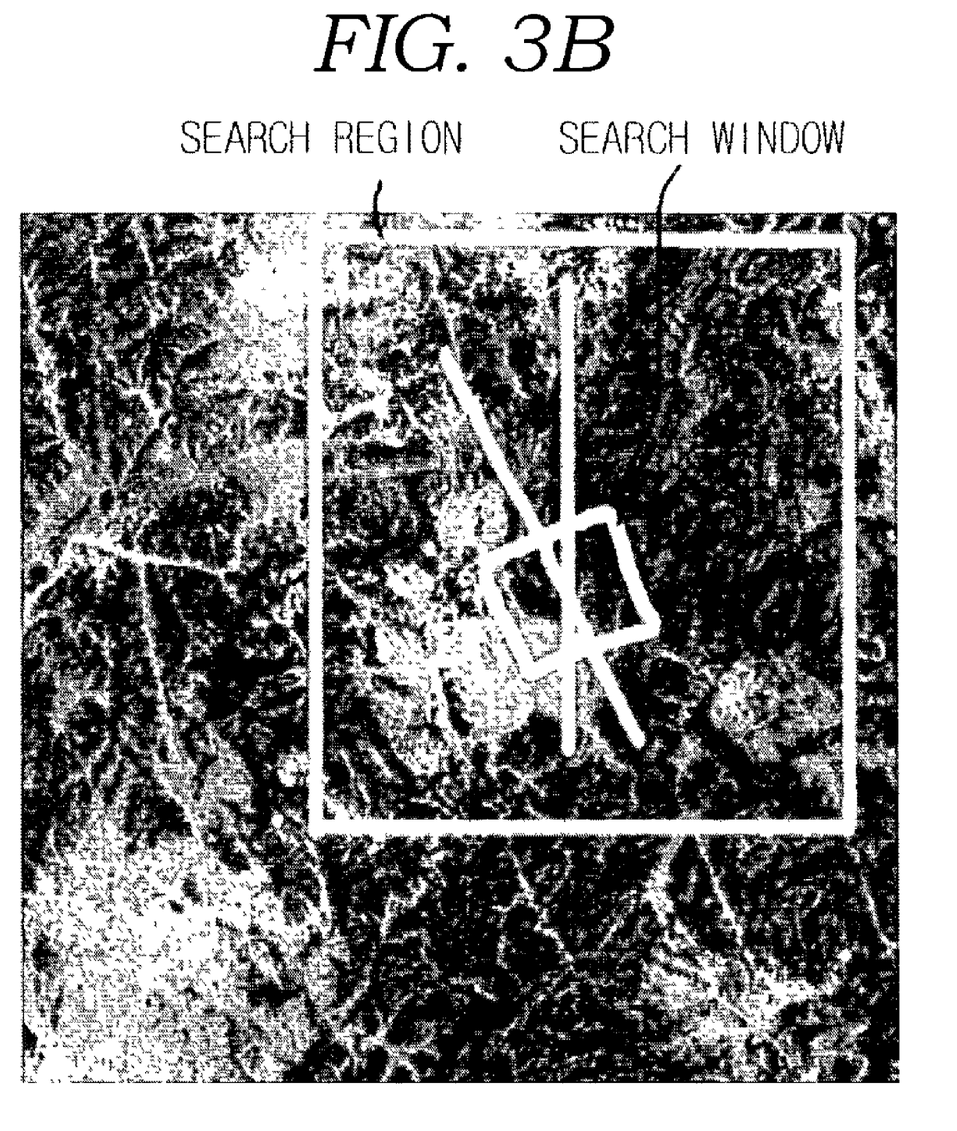

A state where the search window has been rotated according to the orientation angles of the reference image and the target image is shown in FIG. 3. In the figure, (a) shows the reference image including the CP chips, and (b) shows the target image. The image matching process is a process of finding out the same point as the control point of the reference image within the search region of the target image. At this time, an operator measures similarity between the search window of the target image and the CP chips of the reference image while shifting the search window within the search region of the target image. If the size of the search window is adjusted according to the incidence angles or tilt angles of the two images and the search window is rotated according to the orientation angles of the two images, the search results can be improved.

Then, the matching points, which are matched with the control points of the reference image, are found out using a normalized cross-correlation between the CP chips of the reference image and the search window of the target image (step S106). Therefore, the image matching process is completed.

However, when the image matching process has been completed, the image matching results are not perfectly accurate but include some mismatching points. The most of researches or methods performed heretofore have given priority to minimization of occurrence of the mismatching points, whereas the present invention proposes a method of ultimately enhancing matching accuracy by finding out and removing the mismatching points from the matching results.

The step of removing the mismatching points from the matching results of the target image will be hereinafter explained in detail. First, some (at least eight) matching results are selected at random from the above total image matching results (step S107), and a camera model is established (step S108). The camera model is a relationship between a geographic coordinate and an image coordinate calculated according to a location and posture of the satellite at the time of photographing the image. If the camera model is established, row and column coordinates of the image can be converted into a geographic coordinate (X, Y, Z). A technique for establishing the camera model is largely categorized into a physical model, an abstract model, and a general model. In the present invention, the camera model is established through a DLT (direct linear transformation) model corresponding to the abstract model proposed by Gupta and Hartley.

In case of the DLT model employed in the present invention, eight control points are extracted at random and matching results about the extracted control points are substituted into the following formula (3) so that m parameters of an $M_{target}$ matrix of the target image are calculated. This $M_{target}$ matrix of the target image becomes the camera model. If the matching results $(C_{target}, R_{target})$ about the eight arbitrarily extracted control points $(Xi_{ref}, Y_{ref}, Z_{ref})$ are substituted into the following formula (3), the m parameters of the $M_{target}$ matrix can be calculated.

If the $M_{target}$ matrix is calculated, i.e. the camera model is established, the transformation from the geographic coordinate to the image coordinate can be made:

$$\begin{pmatrix} \omega C_{target} \\ R_{target} \\ \omega \end{pmatrix} = \begin{pmatrix} m_{11} & m_{12} & m_{13} & m_{14} \\ m_{21} & m_{22} & m_{23} & m_{24} \\ m_{31} & m_{32} & m_{33} & m_{34} \end{pmatrix} \begin{pmatrix} X_{ref} \\ Y_{ref} \\ Z_{ref} \\ 1 \end{pmatrix}, \quad (3)$$

where $C_{target}$ and $R_{target}$ are the image coordinates of the matching points of the target image; $X_{ref}, Y_{ref}$ and $Z_{ref}$ are the geographic coordinates of the control points; and m parameters are the $M_{target}$ matrix of the target image.

Next, after the $M_{target}$ matrix (camera model) has been calculated as such, the accuracy of the camera model is calculated using the control points other than the eight control points used for establishing the camera model (step S109). That is, the other control points, which are not used for establishing the camera model, are used for calculating the, accuracy of the camera model, and are substituted into the formula (3) so that the calculation results are compared with the matching results about the relevant control points. Based on the similarity between the calculation results about the other control points through the formula (3) and the matching results of the other control points and the number of the control points of which two results are similar to each other, the accuracy of the camera model is calculated.

Then, steps S107 to S109 are again performed. That is, eight random control points and relevant matching results are newly selected among the image matching results, and a new camera model is again established. Then, an accuracy of the newly established camera model is calculated using the control points other than the eight control points which has have been used for establishing the new camera model. Steps S107 to S109 are repeated until the most accurate camera model is found out (step S110). After the most accurate camera model has been found out, the control points fitted to the relevant camera model and the matching results thereof are accepted and the other control points unfitted to the camera model and the matching results thereof are considered as being mismatched.

The process of establishing the camera model based on the control points extracted at random and calculating the accuracy of the camera model using the other control points as described above in the present invention is referred to as a RANSAC (random sample consensus) algorithm.

Next, if the camera model of the target image is accurately established, the target image can be rearranged into the geographic coordinate system by substituting the row and column coordinates and the camera model of the target image into the above formula (3) (step S111). The process of rearranging the target image into the geographic coordinate system as above is called precision geometric collection.

In order to verify the effectiveness of the present invention, the SPOT satellite images of three areas (Taejeon, Boryung, Cheonju) are utilized. The reference images R are first photographed, and the CP chips are extracted and stored. Then, the target images T are photographed. Table 1 below shows the auxiliary data classified according to the respective SPOT satellite images. Since the scene acquisition data of all the SPOT satellite images are different from one another, there are great differences between their earth surface characteristics.

TABLE 1

| Area | Taejeon | Boryung | Cheonju |
|---|---|---|---|
| Scene Acquisition Date | R: 1997.10.14<br>T: 1997.11.15 | R: 1997.3.1<br>T: 1997.11.15 | R: 1997.10.14<br>T: 1997.11.15 |
| Incidence angle | R: 29.7°<br>T: 4.9° | R: −29.7°<br>T: 0.5° | R: 29.7°<br>T: 4.9° |
| Orientation angle | R: 13.7°<br>T: 11.3° | R: 8.1°<br>T: 10.9° | R: 13.7°<br>T: 11.3° |
| Number of control points | 21 | 20 | 16 |

Figure 4A:
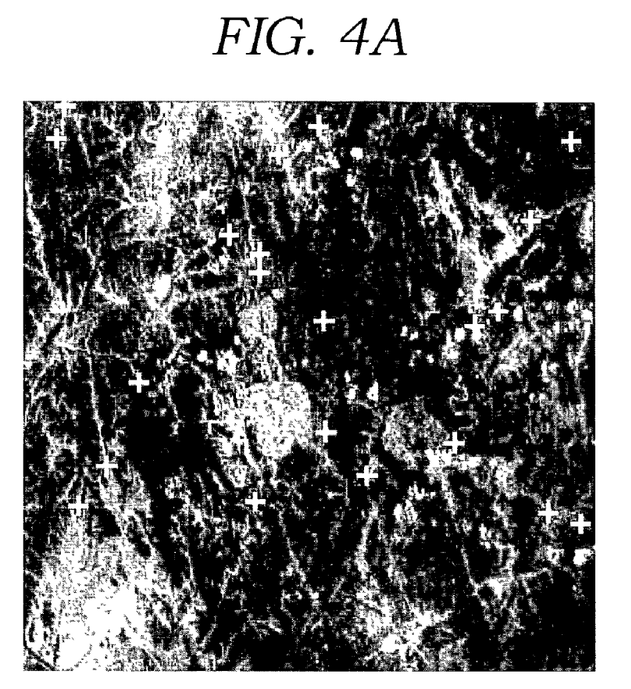
FIG. 4 is a view showing a SPOT satellite image of a Taejeon area for illustrating an advantageous effect of the present invention, wherein (a) shows its reference image and (b) shows its target image.
Figure 4B:
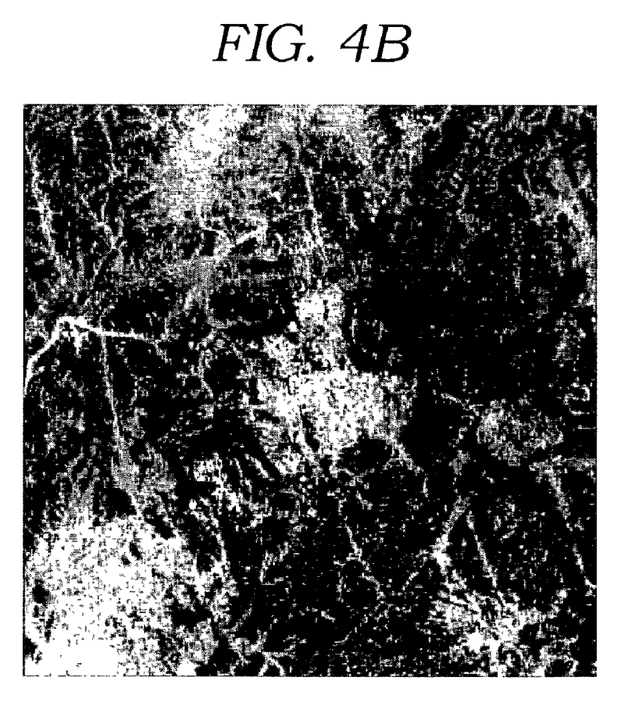

FIG. 4 shows the SPOT satellite image of the Taejeon area, wherein (a) is the reference image thereof and (b) is the target image thereof. In FIG. 4(a), cross marks are control points, and a region within a range of ±200 pixels in a horizontal direction from each of the control points is used as a CP chip. Comparing FIG. 4(a) with FIG. 4(b), it is confirmed that the two images are remarkably different from each other although the identical area has been photographed.

Table 2 below is a comparative table showing the results of finding out the matching points of the target image corresponding to the control points of the reference to image. That is, Table 2 shows ratios of the number of success to the number of failure upon finding out of the matching points corresponding to the control points according to cases where the search window is fixed into a rectangular shape such as in the prior art (C type) and where the size or rotation angle of the search window is changed using the incidence angle or the orientation angle (A type).

TABLE 2

| Area<br>Type of search<br>window | Taejeon | | Boryung | | Cheonju | |
|---|---|---|---|---|---|---|
| | C type | A type | C type | A type | C type | A type |
| Similarity >0.8 | 5:0 | 7:0 | 4:0 | 5:0 | 4:0 | 7:0 |
| 0.6< Similarity <0.8 | 6:10 | 7:7 | 6:3 | 9:3 | 5:5 | 2:2 |
| Similarity <0.6 | Nothing | Nothing | 3:4 | 2:1 | 0:2 | 0:5 |
| Total sum | 11:10 | 14:7 | 13:7 | 16:4 | 9:7 | 9:7 |

From Table 2, regardless of the shape of the search window, the larger the similarity between the reference image and the target image is, the more accurately the matching points for the control points can be found out. Further, if the search window of which size or rotation angle is modified according to the incidence angle or the orientation angle is used instead of using the search window of which size and shape are fixed, a probability that the matching points for the control points can be accurately found is increased. However, if the similarity is not high, it can be confirmed that the matching results include the mismatching points.

Table 3 shows results that the mismatching points are filtered out from the results of searching the matching points of the target image for the control points of the reference image using the RANSAC algorithm and the camera model is then established.

| Test area | Taejeon | Boryung | Cheonju |
|---|---|---|---|
| Number of control points used in the modeling | 14 | 16 | 9 |
| Search results for the mismatching points | 7 | 4 | 7 |
| Modeling error | 0.70 | 0.79 | 0.90 |

As can be seen from Table 3, if the RANSAC algorithm is used, the mismatching points can be accurately filtered out up to 100%. Further, it is understood that there is no difference in accuracy between the actual camera model and the camera model of the present invention. However, there occurs a certain accuracy difference in the image of the Cheonju area. It is considered as a phenomenon resulting from the small number of the control points used.

Figure 5:
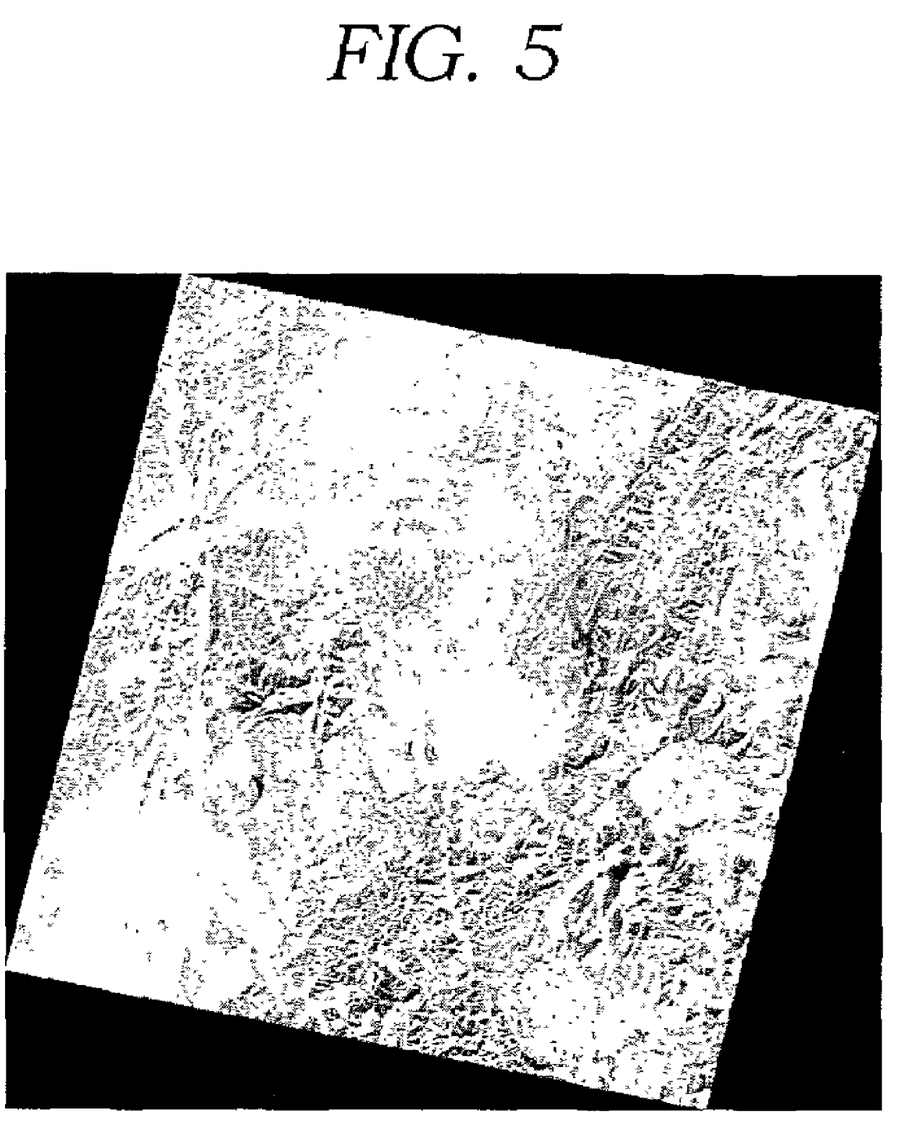
FIG. 5 is a view showing results obtained through processes of finding out matching points of the target image, removing mismatching points from the found matching points, establishing a camera model, and performing a precise correction according to the present invention.

FIG. 5 is a view showing results obtained through processes of finding out matching points of the target image, removing mismatching points from the found matching points, establishing a camera model, and performing a precise correction according to the present invention.

According to the aforementioned image processing method of the present invention, there is, an advantage in that if the reference image and the CP chips are stored in the database, the matching points of the target image corresponding to the control points of the reference image can be automatically extracted without any manual works of the operator. Therefore, there is another advantage in that the image registration and precise correction can be automatically and accurately performed since the mismatching points are removed from the extracted matching results.

Although the present invention has been described in connection with the preferred embodiment, the preferred embodiment is intended not to limit the invention but to exemplify a best mode of the present invention. It will be understood by those skilled in the art that various changes, modifications or adjustments may be made thereto without departing from the spirit and scope of the invention. Therefore, the present invention is defined only by the appended claims which should be construed as covering such changes, modifications or adjustments.

What is claimed is:

1. An image processing method for use in a computer system having a database for storing a reference image, control point chips (CP chips) of the reference image, and auxiliary data including geographic coordinates, incidence angles and orientation angles of the reference image and the CP chips, comprising:
   (a) a CP chip extraction step of, when a target image and auxiliary data including location information, incidence angle information and orientation angle information of the target image are inputted, finding out a region on the reference image corresponding to a region including the target image by using the auxiliary data, selecting the region found on the reference image as a control region, and searching a CP chip included in the control region;
   (b) an image matching step of searching matching points of the target image for control points within the CP chip extracted from the step (a), wherein the step (b) comprises the sub steps of:
      (b1) selecting a search region and a search window of the target image;
      (b2) searching a position corresponding to the CP chip of the reference image from the search region of the target image by using the search window while shifting the search window within the search region of the target image, determining said position having highest similarity between the search window of the target image and the CP chip of the referenced image; and
      (b3) finding out the matching points, which are matched with the control points of the reference image, from the search window used to find out the locations having the highest similarity;
   (c) a mismatching point removing step of removing mismatching points among matching results obtained from the step (b), the removing step comprising using RANSAC algorithm and the camera model; and
   (d) a precise image correction step of arranging the target image into a geographic coordinate system using the matching results obtained after performing the step (c).

2. The method as claimed in claim 1, wherein a size of the search window is changed according to incidence and tilt angles of the target and reference images.

3. The method as claimed in claim 1, wherein the search window is rotated according to the orientation angle of the target image.

4. The method as claimed in claim 1, wherein step (b3) is performed by finding out the matching points of the target image, which are matched with the control points of the reference image, using a normalized cross-correlation relationship between the CP chips and the search window used to find out the locations having the highest similarity.

5. A method as claimed in claim 1, wherein step (c) further comprises the steps of:
   (c1) selecting a portion of the matching results about the predetermined number of control points among the total matching results obtained from step (b) and establishing a camera model through the selected portion of the matching results;
   (c2) calculating accuracy of the camera model using matching results about the other control points other than the selected portion of the matching results used to establish the camera model;
   (c3) selecting again the selected portion of the matching results used to establish the camera model and performing repeatedly steps (c1) and (c2); and
   (c4) extracting a camera model having the highest accuracy after performing step (c3), recognizing matching results, which are not matched with the highest accurate camera model, as the mismatching points, and removing the recognized matching results.

6. The method as claimed in claim 5, wherein in step (c1), m parameters of a $M_{target}$ matrix is calculated by substituting at least eight control points and the matching points corresponding to the control points into the following formula (A):

$$\begin{pmatrix} \omega C_{target} \\ R_{target} \\ \omega \end{pmatrix} = \begin{pmatrix} m_{11} & m_{12} & m_{13} & m_{14} \\ m_{21} & m_{22} & m_{23} & m_{24} \\ m_{31} & m_{32} & m_{33} & m_{34} \end{pmatrix} \begin{pmatrix} X_{ref} \\ Y_{ref} \\ Z_{ref} \\ 1 \end{pmatrix}, \quad (A)$$

Where $C_{target}$ and $R_{target}$ are image coordinates of the matching points of the target image; $X_{ref}$, $Y_{ref}$ and $Z_{ref}$ are the geographic coordinates of the control points corresponding to the matching points; and the m parameters are the $M_{target}$ matrix of the target image, i.e. the camera model.

7. The method as claimed in claim 6, wherein in step (c2), the matching results about the other control points and the camera model are substituted into the above formula (A), and thus, the accuracy of the camera model is calculated using the similarity between calculation results and the matching results and the number of control points by which the two similar results can be obtained.

8. The method as claimed in claim 5, wherein in step (d), the image coordinate of the target image is arranged into the geographic coordinate system through the most accurate camera model.

9. A computer-readable recording medium in which a program for use in a computer system having a database for storing a reference image, control point chips (CP chips) of the reference image, and auxiliary data including geographic coordinates, incidence angles and orientation angles of the reference image and the CP chips is recorded, said program comprising instructions for causing the computer system to implement:
   (i) a CP chip extraction step of, when a target image and auxiliary data including location information, incidence angle information and orientation angle information of the target image are inputted, finding out a region on the reference image corresponding to a region including the target image by using the auxiliary data, selecting the region found on the reference image as a control region, and searching a CP chip included in the control region;
   (ii) an image matching step of searching matching points of the target image for control points within the CP chip extracted from the step (i), wherein the step (ii) comprises the sub steps of:
      (ii1) selecting a search region and a search window of the target image;
      (ii2) searching a position corresponding to the CP chip of the reference image from the search region of the target image by using the search window while shifting the search window within the search region of the target image, determining said position having highest similarity between the search window of the target image and the CP chip of the reference image; and (ii3) finding out the matching points, which are matched with the control points of the reference image; from the search window used to find out the locations having the highest similarity;

(iii) a mismatching point removing step of finding out and removing mismatching points among matching results obtained from the step (ii), the removing step comprising using RANSAC algorithm and the camera model; and (iv) a precise image correction step of arranging the target image into a geographic coordinate system using the matching results obtained after performing the step (iii).

* * * * *